United States Patent [19]

Cataldi et al.

[11] Patent Number: 5,059,895
[45] Date of Patent: Oct. 22, 1991

[54] BATTERY VOLTMETER

[75] Inventors: Richard T. Cataldi, Webster; Patrick D. Hein; Henry J. Heirigs, both of Fairport; John C. Leo, Seneca Falls, all of N.Y.

[73] Assignee: Eastman Kodak Company, Rochester, N.Y.

[21] Appl. No.: 504,504

[22] Filed: Apr. 4, 1990

[51] Int. Cl.⁵ .................. G01N 27/416; G01R 19/04
[52] U.S. Cl. .................................. 324/104; 324/435; 324/437
[58] Field of Search ............... 324/435, 437, 104, 106; 429/7, 90, 91, 92

[56] References Cited

U.S. PATENT DOCUMENTS

| | | | |
|---|---|---|---|
| 4,360,780 | 11/1982 | Skutch, Jr. | 324/437 |
| 4,379,816 | 4/1983 | Mullersman et al. | 429/91 |
| 4,497,881 | 2/1985 | Bertolino | 429/91 |
| 4,702,563 | 10/1987 | Parker | 350/351 |
| 4,702,564 | 10/1987 | Parker | 350/351 |
| 4,726,661 | 2/1988 | Parker | 324/104 |
| 4,727,006 | 2/1988 | Malinowski et al. | 429/90 |
| 4,737,020 | 4/1988 | Parker | 350/351 |
| 4,835,475 | 5/1989 | Hanakura et al. | 324/435 |
| 4,835,476 | 5/1989 | Kurosawa | 324/435 |

Primary Examiner—Kenneth A. Wieder
Assistant Examiner—Maura K. Regan
Attorney, Agent, or Firm—John R. Everett

[57] ABSTRACT

The present invention discloses a battery voltmeter comprising:
A) a dielectric layer;
B) a conductive layer above or below one of the surfaces of the dielectric layer; and
C) a temperature sensitive color indicator layer in thermal contact with the conductive layer, characterized in that the conductive layer has i) thermal insulating means under one of its surfaces and ii) sufficient heat generating capacity to affect a change in the temperature sensitive color indicator layer. The voltmeter can be intergrated into a label and attached directly to a battery.

29 Claims, 3 Drawing Sheets

BATTERY VOLTMETER

FIELD OF THE INVENTION

This invention relates to voltmeters, particularly voltmeters for batteries.

BACKGROUND OF THE INVENTION

Batteries are routinely stored prior to and during use. Frequently they are discarded after storage while still having useful electrical power.

Battery testers for indicating battery capacity are known. Such devices are described in U.S. Pat. Nos. 4,737,020; 4,702,564; 4,702,563; 4,835,475; 4,835,476, etc. Such testers have also been incorporated into battery packaging. See U.S. Pat. No. 4,838,475.

These testers generally include a conductive layer in thermal contact with a temperature sensitive color indicator layer. When the ends of the conductive layer are contacted to battery terminals, electrical current flows, creating heat in the conductive layer. The heat causes a change in the indicator layer.

The usefulness of the above devices is extremely limited. They are also inconvenient to use. The tester must be carried as a separate item. This is aggravated in the case of testers incorporated into a package since the entire package must be carried separately.

In addition, current tester designs do not allow ease of operation on all cells. In most cases the tester is larger than the battery for which the tester is designed. This makes it difficult to maintain the terminals of the testers in contact with the batteries and achieve reproducible results because such testers are generally flexible.

Also the prior art battery testers cannot be used when the conductive circuits of the testers are in contact with battery housings. We have determined that the housings act as a heat sink diverting heat generated by the conductive layer away from the tester color indicating layer.

SUMMARY OF THE INVENTION

The present invention provides a voltmeter comprising:
A) a dielectric layer;
B) a conductive layer above or below one of the surfaces of the dielectric layer; and
C) a temperature sensitive color indicator layer in thermal contact with the conductive layer,
characterized in that the conductive layer has i) thermal insulating means under one of its surfaces and ii) sufficient heat generating capacity to affect a change in the temperature sensitive color indicator layer.

The present invention also provides a label comprising an integral voltmeter having:
A) a dielectric layer;
B) a conductive layer above or below the dielectric layer; and
C) a temperature sensitive color indicator layer in thermal contact with the conductive layer,
characterized in that 1) the conductive layer has i) thermal insulating means under one of its surfaces and ii) sufficient heat generating capacity to affect a change in the temperature sensitive color indicator layer and 2) the voltmeter includes means for forming an electrical switch with electrically conductive surfaces of a battery housing.

The present invention also provides a battery having a label comprising:
A) a dielectric layer;
B) a conductive layer above the dielectric layer;
C) a graphics layer for measuring color change proximate to a temperature sensitive color indicator layer; and
D) a temperature sensitive color indicator layer in thermal contact with the conductive layer,
characterized in that 1) the conductive layer has i) thermal insulating means under one of its surfaces and ii) sufficient heat generating capacity to affect a change in the temperature sensitive color indicator layer and 2) the voltmeter includes means for forming an electrical switch with electrically conductive surfaces of the battery housing.

The voltmeter of the present invention obviates the disadvantages of the prior art in that the voltmeter can always be carried along with the battery. The difficulty of engaging the terminals of the voltmeter to the terminals of the battery are eliminated by the unique switching means provided by this invention. Thus reproducible measurements are easily attained.

Moreover the voltmeter of the present invention overcomes the heat sink problem encountered by prior art battery testers by providing thermal insulating means between the conductive layer and the battery housing and providing a conductive layer that generates sufficient heat to affect a change in the color indicator layer.

DETAILED DESCRIPTION OF THE INVENTION

The various elements, embodiments and features of the voltmeter, labels and batteries described hereinbefore will be better understood by reference to FIGS. 1 through 5 and the related descriptions.

Figure 1:
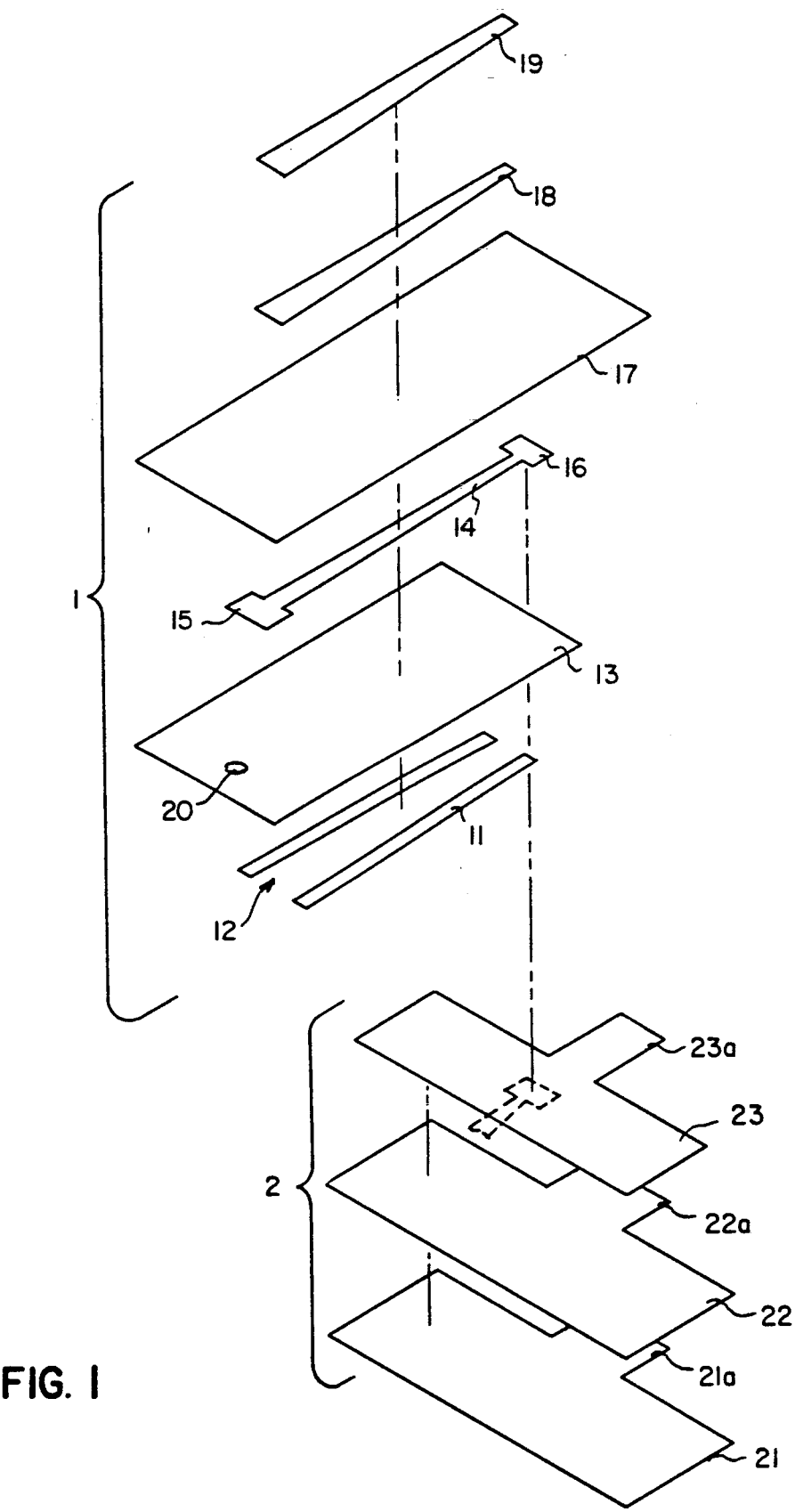
FIG. 1 is an exploded view of the various layers of a voltmeter of the invention together with and exploded view of an assembly used to attached the voltmeter to a battery.

An embodiment of the voltmeter of the present invention is shown in FIG. 1. The voltmeter 1, in an exploded view shows standoffs 11 for creating a temperature insulating air pocket 12 underneath dielectric layer 13. The standoffs can be plastic strips, embossed or printed dielectric inks. The standoff can also be formed by embossing crimps into the dielectric layer. Instead of an air pocket the thermal insulating means can be provided by inserting thermal insulating materials such as paper, plastic or cloth under the dielectric layer area 12. The dielectric layer can be formed from any electrically insulating material.

Essential to this invention is the thermal insulating means for the conductive layer provided in this embodiment by an air pocket. This air pocket insulates the conductive layer from the battery can when the voltmeter is combined with a battery, either alone or as part of a battery label.

Above layer 13 is conductive layer 14 having terminal ends 15 and 16. The conductive layer can be self supporting or it can be coated on a support such as the dielectric layer or another layer included in the voltmeter.

The conductive layer is deposited on dielectric layer 13 by printing, coating, painting or other conventional techniques. This conductive material may be silver, nickel, iron, copper, carbon, lead, etc., and mixtures thereof and is preferably dispersed in some type of binder material to form a conductive ink. Silver is the preferred conductor; typical thicknesses are 0.0002-0.001 inch (0.00508-0.0254 mm). A suitable silver based conductive ink is Zymet SLP4070 made by Zymet, Inc., Hanover, N.J.

The conductive layer is designed to have an increasing cross sectional area in a longitudinal direction from one end to the other, thus creating a gradient of heat generation along the length of the layer which is dependent on the voltage and current output and thus strength of the battery. The battery current which flows through the conductive layer during testing is directly proportional to the voltage because the resistance of the conductive layer is fixed. A resistance of about 1 to 2.5 ohms works for standard 1.5 volt alkaline batteries. For this fixed resistance the indicating scale can be calibrated to display the corresponding state of charge or service life remaining in the battery. The dimensions and resulting resistance of the conductive layer can be adjusted for any battery voltage or current. It is clear from Ohm's law the voltmeter can be calibrated for volts, current, remaining service life or state of charge.

Above conductive layer 14 is label layer 17. Label layer 17 may comprise one or more layers depending upon the particular label design. In some embodiments label layer 17 is not included since dielectric layer 13 may serve also as a label layer. This embodiment of the invention shows the voltmeter optionally integrated into a battery label. In some embodiments where the voltmeter is included in a window of a label, the label layer 17 will be omitted from the voltmeter of FIG. 1.

Residing on label layer 17, or optionally, directly on the conductive layer is a calibrated graphic scale 18 for measuring voltage or current. The graphics layer provides background and/or a calibrated scale for indicating changes in the color indicator layer 19 according to the voltage or current status of a battery. It will be obvious to those skilled in the art that the graphics layer can be omitted in those case where the color change in the temperature sensitive color indicator layer is visually observable.

Above or alongside the graphic scale is a temperature sensitive color indicator layer 19. The temperature sensitive color indicator layer is color reversible in response to a temperature change and thereby detects the changes in temperature of the voltmeter conductive layer. Useful color reversible temperature sensitive materials are well known in this art. They include microencapsulated cholesteric liquid crystal and reversible thermochromic materials. Both types of materials can be modified to achieve the optimum color change in a desired temperature range. They can be coated by standard printing, coating or painting techniques. Coating thicknesses of 0.001-0.002 inch are useful. Examples of suitable materials are chiral nematic liquid crystals, and thermochromic ink and thermochromic tapes. The color indicator layer changes from color to colorless; colorless to a color; or one color to a second color.

Figure 2:
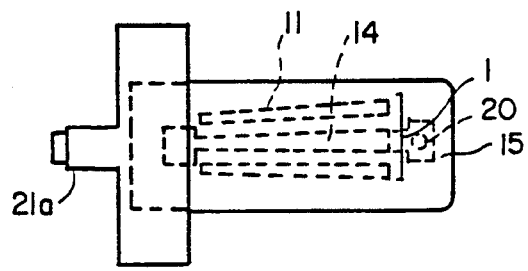
FIG. 2 is a schematic drawing of the combined voltmeter and assembly of FIG. 1.
Figure 3:
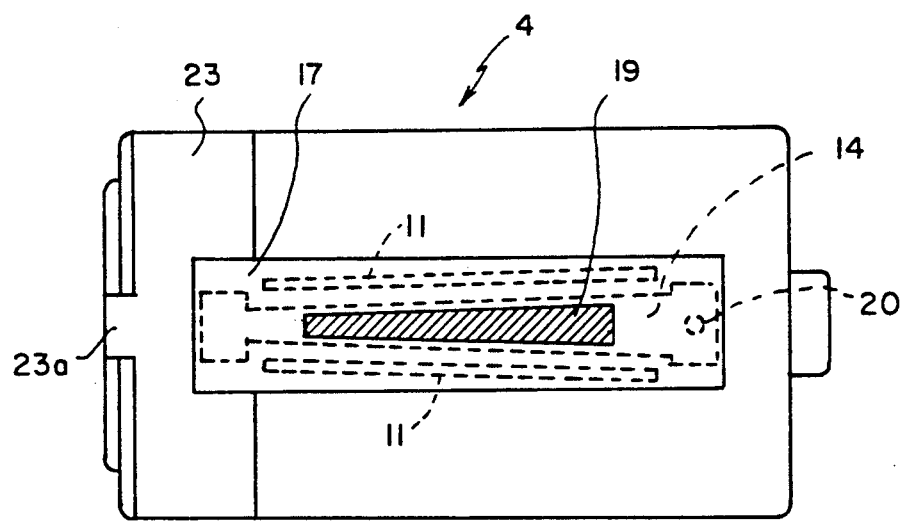
FIG. 3 is a schematic drawing of the combined assembly of FIG. 2 attached to a battery.
Figure 5:
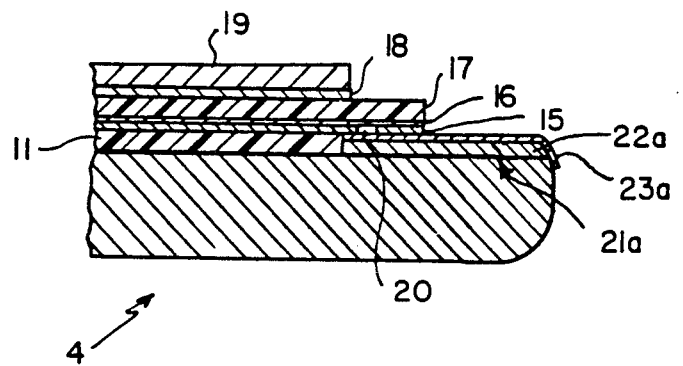
FIGS. 4 and 5 both show electrical membrane switches to be used when the voltmeter is attached to a battery.

The voltmeter 1 is then assembled with assembly 2 of FIG. 1 for use in combination with a battery. Assembly 2, also shown in exploded view, comprises an adhesive layer 21, an electrically insulating layer 22, an electrically conducting layer 23 and tabs 21a, 22a and 23a. The assembled voltmeter 1 of FIG. 1 is assembled with the assembly 2 by resting the terminal end 16 of conductive layer 14 on conducting tab 23a. The combined assemblies 1 and 2 are then adhered to the surface of a battery. The combined assemblies 1 and 2 of FIG. 1 is shown in FIG. 2. The combination shows the voltmeter 1 and the assembly 2. The conductive layer 14, is shown by broken lines in contact with the conductive layer of assembly 2 with the conductive layer 23 extending to form the longest part of tab 23a. FIG. 3 shows schematically the combined assemblies of FIGS. 1 and 2 in combination with a battery housing 4.

The current flow through the conductive layer which results in the above heat generation and color change is initiated by connecting the terminals of the battery to the terminals in the voltmeter conductive layer through an incorporated switch mechanism.

Electrical switching means for completing an electrical circuit between battery electrodes and the conductive layer of the voltmeter include, but are not limited to the following switching means embodiments.

1) A reversible pressure sensitive membrane switch built into the battery label layers to contact the positive terminal of the battery (battery can). This switch is constructed by introducing a "hole" in the dielectric layer of the voltmeter directly under one end of the conductive layer, as described hereinafter in connection with the figures, thus isolating the contact from the battery can. Activation of the voltmeter occurs when pressure is applied on the flexible upper layer of the label layer above the end of conductive layer above the hole in the dielectric layer. The pressure causes the conductive layer to make electrical contact with the battery can through the dielectric layer. Rigidity and springback in the label layer causes the connection to be broken when pressure is discontinued. The connection to the negative terminal of the battery, which completes the circuit, is fixed to the conductive layer of the voltmeter in a manner described herinafter in connection with the figures, with a conductive foil adhesive strip that is electrically insulated from the battery can. This strip can be either a separate piece under the label or incorporated into the non-visible side of the label construction. A small tab of this foil strip is connected permanently to the negative terminal cap of the battery during the label application process to complete the connection.

2) An external "tab" switch which protrudes beyond the end of the battery past either one of the terminals. The tab switch is not permanently connected to one terminal of the battery. Instead, the tab is contacted with the terminal only when it is desired to activate the voltmeter. The other battery terminal is connected, permanently to the other end of the voltmeter conductive layer.

3) An external switch as in 2) except that the tab is contacted to the negative battery terminal through an external conductor such as a coin, wire, etc.

4) The above described membrane switch mechanism can also be incorporated into both ends of the conductive layer thus making a double membrane switch operation necessary for activation of the tester. This has the advantage of being less susceptible to accidental activation of the voltmeter during handling or battery storage in a device which could result in a draining of useful battery life. The negative terminal connection would remain as described above.

In all of the above switch variations the resulting battery voltage or capacity is read from the appropriate indicating scale while the switch is activated. Release of the switch causes the circuit to open and the temperature sensitive color indicator layer to return to its prior state. This can be repeated until there is insufficient battery strength or capacity to cause a color change.

The above switch mechanisms can be achieved by adhering the voltmeter to a battery directly or by integrating the voltmeter into a label and then applying the label-voltmeter assembly directly to the can.

In one embodiment a membrane switch, referred to above, is formed by placing the conductive terminal end 15 in registration with the hole 20 in layer 13. The voltmeter 1, of FIG. 1 is then assembled with the layers in the order indicated above.

In the membrane switch embodiment under discussion the conductive layer of the tab 23a is adhered permanently to the bottom negative electrode of the battery.

The operation of the membrane switch is explained by reference to FIGS. 1 and 4. The numbering of elements in FIG. 1 is carried over into FIG. 4 for similar elements. The hole 20 in layer 13 in FIGS. 1 and 4 is in registration with one of the terminal ends 15 of the conductive layer 13.

Figure 4:
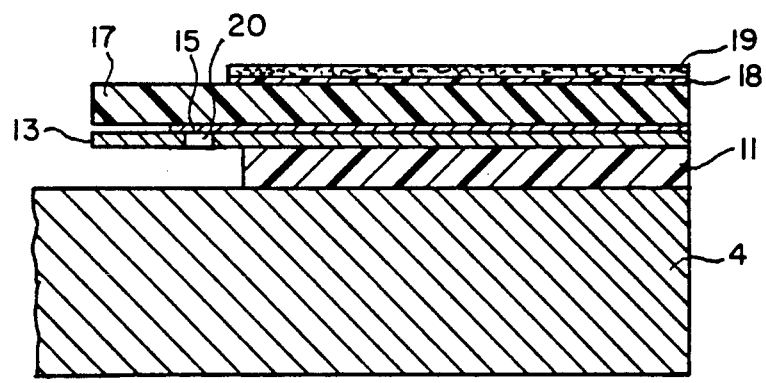

In FIG. 4, the conductive layer terminal end 15 is shown in registration with the hole 20 in layer 13 on stand-offs 11. When pressure is applied to the label layer 17 directly above hole 20 the conductive layer terminal 15 is brought into contact with the electrically conductive surface of the battery 4. Since the tab 23a of 2 of FIG. 1 is already in electrical contact with the negative terminal of the battery, the electrical circuit is closed, electrical current from the battery flows through conductive layer 14 creating heat that causes a change in the color indicator layer.

In another switch embodiment two separate membrane switches are used. In this embodiment both switches must be engaged at the same time to form a complete electrical circuit between the conductive layer of the voltmeter and the battery. Both terminal ends 15 and 16 of conductive layer 14 in voltmeter 1 in FIG. 1 are each in registration with separate holes in the dielectric layer 13. Neither terminal end, 15 or 16 is in permanent electrical contact with the battery. This second membrane switch is made clear by reference to FIG. 5. The terminal 16 in registration with a second hole 20 in the layer 13. This second hole is directly above the electrically conductive layer 23 of assembly 2 of FIG. 1. Tab 23a is in permanent electrical contact with the negative electrode of the battery. Pressure is applied to the label layer 17 directly above hole 20 to bring the conductive terminal end 16 into electrical contact with conductive layer 23. With both conductive layer terminals 15 and 16, in contact with the positive and negative terminals of the battery the voltmeter is activated.

The label of this invention comprising a voltmeter is composed of a one or more layers usually bearing graphic information about the battery. Such layers can include a standard heat shrinkable label material and may be of single or multiple layer design.

For the single layer label, the desired graphics are printed on a designated side of the material using standard lithographic, flexographic, gravure or screen processes and ink materials. An additional final coating such as varnish may be applied for protection of the printed graphics.

In the multiple layer label, the desired graphics are printed on the label using the aforementioned techniques after which the substrate is laminated to another layer of the same or different material to form the multiple layer effect. Many of the multiple layer designs also include a metallized foil layer for graphics enhancement. An example of such a design would be PVC Triplex ZE from Zweckform GmbH, Holzkirchen, FRG.

Both the single layer and multiple layer designs can be employed on the battery by the pressure sensitive or tube technique. In the pressure sensitive technique, an adhesive coating is added to the reverse of the label which adheres and aligns the label to the battery until the final shrink fit at elevated temperature is completed. For the tube technique, the ends of the label are sealed to itself to create an open ended "tube" which is placed over the battery in position for the final shrink fit. Labeling methods for batteries are well known in the art.

The invention has been described in detail with particular reference to preferred embodiments thereof, but it will be understood that variations and modifications can be effected within the spirit and scope of the invention.

We claim:
1. A voltmeter comprising:
   A) a dielectric layer;
   B) a conductive layer above or below one of the surfaces of the dielectric layer; and
   C) a temperature sensitive color indicator layer in thermal contact with the conductive layer,
characterized in that the conductive layer has i) an air pocket under one of its surfaces and ii) sufficient heat generating capacity to affect a change in the temperature sensitive color indicator layer.

2. The voltmeter of claim 1 wherein the air pocket is formed by standoffs located on the dielectric layer surface most distant from the conductive layer.

3. The voltmeter of claim 1 wherein the color indicator layer is selected from thermochromic inks, liquid crystalline materials and thermochromic tapes.

4. The voltmeter of claim 1 wherein the conductive layer is formed from conductive inks, conductive polymers, metal foil or metal wire.

5. The voltmeter of claim 4 wherein the conductive inks comprise silver, copper, carbon or mixtures thereof.

6. The voltmeter of claim 1 wherein the insulating means is formed by placing a temperature insulating material under the conductive layer.

7. The voltmeter of claim 1 wherein the color indicator layer changes from:
   A) a color to colorless;
   B) colorless to a color; or
   C) one color to a second color.

8. The voltmeter of claim 1 wherein the graphics layer includes a scale calibrated to indicate battery voltage, current, or battery useful life according to changes in the color indicator layer.

9. A label comprising voltmeter according to claim 1.

10. A label having a window cut out area therein in which a voltmeter according to claim 1 resides.

11. A label comprising an integral battery voltmeter having:
   A) a dielectric layer;
   B) a conductive layer above or below the dielectric layer; and
   C) a temperature sensitive color indicator layer in thermal contact with the conductive layer,
characterized in that 1) the conductive layer has i) sufficient heat generating capacity to affect a change in the temperature sensitive color indictor layer and ii) sufficient thermal insulating means under one of its surfaces to overcome heat sinking when the voltmeter is in contact with a battery having an electrically conducting housing and 2) the voltmeter includes means for forming an electrical switch with the electrically conductive battery housing.

12. A label comprising an integral battery voltmeter having a plurality of layers in the following order:
   A) a dielectric layer;
   B) a conductive layer;
   C) one or more substrate layers for the label;
   D) a temperature sensitive color indicator layer; and
characterized in that 1) the conductive layer has i) sufficient heat generating capacity to affect a change in the temperature sensitive color indicator layer and ii) sufficient thermal insulating means under one of its surfaces to overcome heat sinking when the voltmeter is in contact with a battery having an electrically conducting housing and 2) the voltmeter includes means for forming an electrical switch with the electrically conductive battery housing.

13. The label of claim 11, wherein the dielectric layer also serves as the label.

14. The label of claim 12 wherein one or more layers are included for labeling purposes between the conductive layer and the color indicator layer.

15. A label according to claim 14 wherein one or both ends of the conductive layer extends beyond one or both edges of the label.

16. A label according to claim 11 or 12 wherein one or both ends of the conductive layer are in registration with holes in the dielectric layer.

17. A label according to any one of claims 11 or 12 wherein a graphics layer having a scale calibrated for voltage or current is included below or alongside the color indicator layer.

18. A label according to claim 11 or 12 wherein the temperature insulating means is formed by placing a temperature insulating material under the conductive layer.

19. A label according to claim 11 or 12 wherein the temperature insulating means forms an air pocket.

20. A battery having a label with an integral voltmeter; wherein the voltmeter comprises:
   A) a dielectric layer;
   B) a conductive layer above or below the dielectric layer; and
   C) a temperature sensitive color indicator layer in thermal contact with the conductive layer,
characterized in that 1) the conductive layer has i) sufficient heat generating capacity to affect a change in the temperature sensitive color indicator layer and ii) sufficient thermal insulating means under one of its surfaces to overcome heat sinking when the voltmeter is in contact with a battery having an electrically conducting housing and 2) the voltmeter includes means for forming an electrical switch with the electrically conductive battery housing.

21. A battery having a label with an integral voltmeter; wherein the voltmeter comprises a plurality of layers in the following order:
   A) a dielectric layer;
   B) a conductive layer;
   C) one or more substrate layers for the label; and
   D) a temperature sensitive color indicator layer,
characterized in that 1) the conductive layer has i) sufficient heat generating capacity to affect a change in the temperature sensitive color indicator layer and ii) sufficient thermal insulating means under one of its surfaces to overcome heat sinking when the voltmeter is in contact with a battery having an electrically conducting housing and 2) the voltmeter includes means for forming an electrical switch with the electrically conductive battery housing.

22. The battery of claim 20 wherein the dielectric layer also serves as the label.

23. The battery of claim 21 wherein one or more layers are included for labeling purposes between the conductive layer and the color indicator layer.

24. A battery according to claim 20 or 21 wherein the ends of the conductive layer are each of sufficient length to make electrical contact with each battery electrode.

25. A battery according to claim 20 or 21 wherein one or both terminals of the conductive layers are in registration with different holes in the dielectric layer thereby forming membrane electrical switches for activating the voltmeter.

26. A battery according to claim 20 or 21 wherein one end the conductive layer is in electrical contact with one electrode of the battery and the other end has tab that extends above or below one of the edges of the label sufficiently to engage the other battery electrode thereby forming an electrical switch.

27. A battery according to claim 20 or 21 wherein one of the end of the conductive layer is in electrical contact with one electrode of the battery and the other end forms a tab that extends above or below one of the edges of the label sufficiently to engage the other battery electrode through an accessory electrical conductor thereby forming an electrical switch.

28. A battery according to claim 20 or 21 wherein the insulating means is formed by inserting a temperature insulating material between the battery surface and the conductive layer.

29. A battery according to claim 21 wherein insulating means is an air pocket under the dielectric substrate under the area of the conductive layer.

* * * * *